United States Patent [19]
Gilson

[11] Patent Number: 4,698,022
[45] Date of Patent: Oct. 6, 1987

[54] VISUAL OCCULSION APPARATUS FOR PILOT TRAINING

[75] Inventor: Richard D. Gilson, Columbus, Ohio

[73] Assignee: Foggles, Inc., Columbus, Ohio

[21] Appl. No.: 272,539

[22] Filed: Jun. 11, 1981

[51] Int. Cl.$^4$ .............................................. G09B 9/00
[52] U.S. Cl. ....................................... 434/36; 351/47; 351/57; 351/86
[58] Field of Search ...................... 434/35, 36; 351/47, 351/57, 86; 2/13–15; 350/331, 332, 339 D

[56] References Cited

U.S. PATENT DOCUMENTS

| | | | |
|---|---|---|---|
| 2,510,848 | 6/1950 | Wood | 434/36 |
| 2,572,656 | 10/1951 | Ortenburger | 434/36 |
| 3,356,439 | 12/1967 | Magnus | 351/47 |
| 3,453,042 | 7/1969 | Cooper | 351/47 |
| 3,499,112 | 3/1970 | Heilmeier | 350/331 |
| 4,106,217 | 8/1978 | Witt | 434/36 |
| 4,119,369 | 10/1978 | Eloranta et al. | 351/47 |
| 4,298,249 | 11/1981 | Gloor | 350/339 D |

OTHER PUBLICATIONS

Buckwalter, L.; *Video Games*; 1977; pp. 105–111.

*Primary Examiner*—Leo P. Picard
*Attorney, Agent, or Firm*—Mueller and Smith

[57] ABSTRACT

Apparatus for carrying out aircraft pilot training and proficiency procedures comprising goggles having selectively translucent regions adjusting sight distance through the windscreen of the aircraft while permitting unrestricted vision of cockpit instrumentation. The vision occluding regions may be provided as polymeric overlays having a translucency selected for varying visibility distances and which may be mounted upon the lens region of the goggles in removable fashion through the development of static electricity between the components.

10 Claims, 4 Drawing Figures

VISUAL OCCULSION APPARATUS FOR PILOT TRAINING

BACKGROUND OF THE INVENTION

The initial training procedures as well as subsequent proficiency determinations which have evolved in connection with the instruction of pilots provides for the carrying out of a variety of defined aircraft maneuvers. Such maneuvers, for example, will include stalls, steep turns, climbs, descents, and the like and, in accordance with F.A.A. regulations, each of these airborne maneuvers must be carried out in conjunction with visual outside references (VFR) as well as solely by reference to instruments, (IFR). See F.A.A. regulation 61.43. To obtain or maintain instrument certification, instrument flight time generally is logged under airborne flight conditions wherein the individual under training utilizes equipment which excludes any visual reference outside of the aircraft. See F.A.A. Regulation 61.45(d), 61.51(c)(4).

To provide airborne simulation of conditions wherein outside references are blocked to the pilot's vision, several implementations have been utilized. One approach has been to provide an opaque canopy which covers the pilot's head, thus permitting only an observation by the pilot of controls and instruments within the cockpit, extended observation of the flight region exterior to the aircraft being availed only to an instructor or safety pilot attending the individual in training.

Another technique implementing such training has been to utilize a blue-yellow chromatic screening technique wherein, for example, a blue transparent polymeric material is positioned against the windscreen of the aircraft, while the pilot under instruction wears yellow tinted glasses. As a consequence, the vision of the pilot under instruction is blocked only with respect to the region or world outside of the cockpit, while the instructor or safety pilot may observe that outside world, albeit in a tinted fashion. Such an arrangement, however, has been found to be unsafe and has fallen from use.

Still another widely used technique involves the use of a plastic hood type device which is positioned upon the head of the pilot under instruction and is shaped generally in the form of a vision-directing half-tube extending from the face of that pilot about 6 inches and is pivotal downwardly to an extent where all peripheral and forward vision is fully blocked except for the instrumentation within the cockpit. Some versions of this device have a shorter forwardly extending tube, however, both embodiments present a hazzard during the airborne training sessions, inasmuch as the vision of the instructor or safety pilot is somewhat blocked by the rather bulksome and forwardly extending device. As a further aspect of these devices, they are somewhat expensive and are often misplaced and lost by both student pilots as well as instructors, usually being inadvertently left in the aircraft following training inasmuch as they cannot be stored conveniently in a pocket or the like. The amount of use of the devices, however, is somewhat extensive, 40 hours of flight time being required to develop instrument flying proficiency and a recurring requirement for proficiency of 6 hours of instrument flight time often times with the devices being necessitated thereafter. Thus, periods of aircraft operation in and about airfields and the like using these devices which may pose hazards are quite significant. Another disadvantage which has developed in connection with the canopy and tube type device resides in the claustrophobic effect which they have on the student pilot. In particular, the student is required to look with constrained vision under an elongate half-tube. This is not the actual flying condition encountered during non-simulated instrument flight and thus, does not evoke the desired close simulation of actual adverse flight conditions.

Another aspect of aircraft operation under conditions of occluded vision involves adverse weather flying. Pilots are provided extensive weather analysis prior to take-off and by radio communication during flight. However, the extent of airborne training with respect to airborne encountered weather is minimal at best, and the importance of pilot competencey under adverse weather conditions becomes manifest considering that 30 percent of all fatal aircraft incidences result from adverse weather. Of compelling importance, aircraft pilots should retain a capability to make competent judgement as to when to turn around in the face of weather (particularly in the face of hard-to-judge visibility restrictions) and return to base; to proceed to alternate airports; or solicit help by radio from ground based stations.

SUMMARY OF THE INVENTION

The present invention is addressed to apparatus for carrying out aircraft pilot training and proficiency procedures with improved effectiveness and safety. The invention further serves to provide training to improve pilot flight safety analysis and judgment during adverse weather conditions encountered while airborne.

Another object of the invention is to provide a vision occlusion apparatus for selectively occluding the vision of a pilot during training procedures wherein the pilot is seated at a command position next to oppositely disposed side-viewing windows and before a windscreen extending upwardly from a periphery defining cowling region of the aircraft. Spectacles are provided which include preferably a plano or non-correcting principal lens region having a predetermined area extent and such lens region is supported by a frame having a forward support region which is nestable over the upper nose region of the pilot so as to position the non-correcting lens region before the eyes of the pilot. Two earpiece components which are mutually spaced and pivotally coupled to the frame at opposite, outwardly disposed peripheries of the lens region are provided with the apparatus, each such earpiece being extensible over an ear of the pilot. The lens region predetermined extent is effective for intercepting all substantially forward vision of the pilot when the spectacles are position before the pilot's eyes in conventional manner. An occlusion arrangement at the lens region is provided which has a border defined area extent for selectively occluding the vision of the pilot for lines-of-sight in visual space extending from the eyes of the pilot through the windscreen of the aircraft and which effects unrestrictive lines-of-sight in visual space extending below the periphery defining cowling region such that the pilot may observe the instrumentation of the cockpit in unhindered fashion.

As another feature and object of the invention, in a preferred embodiment suited for side-by-side cockpit seating, the border of the occluded region of the spectacles with respect to the right eye lens region is substantially defined by lines-of-sight between the pilot's right eye and the forwardmost region of the right side window of the cockpit, while the border of the occlusion region with respect to the left eye lens region of the spectacles is substantially defined by lines of sight between the pilot's left eye and the forwardmost region of the left side window.

As another feature and object of the invention, the occlusion arrangement is effected as a translucency of extent selected with respect to one or more predetermined visibility distances. Preferably, the occlusion region is developed by a thin polymeric overlay which is manually positionable over the spectacle lens region and which is substantially uniformly translucent in an amount selected with respect to a predetermined visibility distance. The occlusion arrangement may further comprise one or more additional thin polymeric overlays coextensive with and manually positioned over the first polymeric overlay and each of which is substantially uniformly translucent in an amount selected with respect to a predetermined visibility distance. Preferably, the polymeric overlays are configured for removable retention in nesting fashion upon the spectacle lens region by static electricity.

As another feature and object of the invention, the earpiece components of the spectacles according to the invention will include a mask which extends rearwardly from a position of adjacency with the spectacle frames for occluding lines-of-sight representing peripheral vision of the pilot.

Other objects of the invention will, in part, be obvious and will, in part, appear hereinafter. The invention, accordingly, comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

An important aspect of the instant invention involves the training of aircraft pilots to make improved judgments in connection with marginal weather flying. In general practice, pilots receive pre-flight weather information which they analyze while on the ground and prepare the flight program in accordance therewith. Once in the air, however, they are in a position wherein instantaneous decisions as to weather conditions must be made. Where flying into worsening weather conditions (particularly limited visibility by fog, haze, smoke, etc.), the pilot must be capable of analyzing such conditions to determine the extent of this worsening condition and to make a reasonable decision as to whether to turn the aircraft around and return to the initial airport, to divert the aircraft course to an alternate airport, or to solicit ground-based help through radio communication. Pilot judgment of weather, however, particularly for less experienced pilots, at times has been found to be less than adequate. This inadequate judgment has been determined to result in a somewhat unconscious reaction to varying visibilities encountered in worsening weather.

Figure 1:
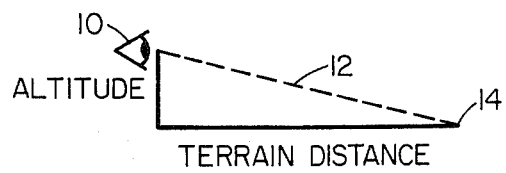
FIG. 1 is a schematic triangular representation of the eye position of the pilot with respect to aircraft altitude and terrain distance.

Looking to FIG. 1, a simple geometric representation of the eye position 10 of a pilot with respect to a given altitude of aircraft and forward visibility to a point 14 along a "terrain distance" is provided. Because eye position 10 is located within the aircraft cockpit at a level wherein the pilot looks over the cowling of the aircraft, the resultant line of sight in a forward direction is as represented as line-of-sight 12. Generally the length of the line-of-sight 12 to the terrain 14 will vary with respect to altitude in accordance with about a 6:1 ratio. Thus, should the pilot be flying at about 6,000 feet altitude, a sight distance 12 will amount to about 5 or 6 miles visibility. Should the pilot be flying into worsening weather, the pilot will gradually lose sight of the ground at point 14 and, in consequence, it has been observed that pilots will unconsciously descend the aircraft until such time as terrain is again sighted along the lin of sight over the aircraft cowling. Thus, as the aircraft continues to fly into worsening weather the pilot tends to gradually descend the aircraft and retain a natural horizon without a realistic evaluation of the extent of weather deterioration. Further, as weather continues to deteriorate, pilots tend to fly toward navigational aids and this universal tendency leads to a condition wherein a plurality of aircraft may be moving toward a common navigational aid at about the same altitude. The hazard of such a condition is apparent.

In view of the foregoing, it is desirable to provide some form of training wherein a reasonably realistic pilot diagnosis of worsening weather conditions can be provided.

Figure 2:
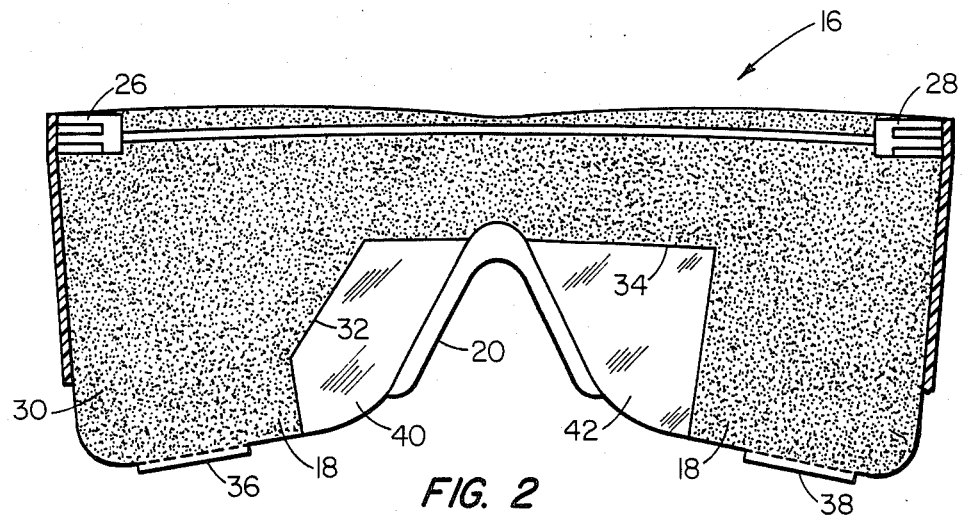
FIG. 2 is a partially sectional rear view of the lens region the spectacles according to the invention as taken through the sectional plane 3—3 of FIG. 3.
Figure 3:
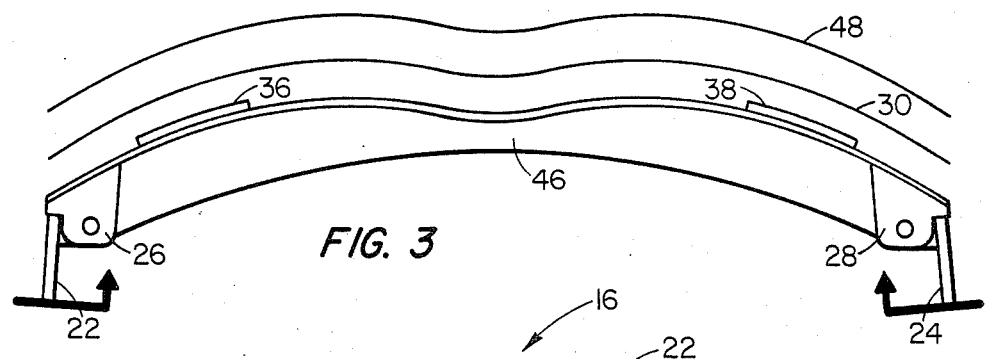
FIG. 3 is a partially exploded top view of spectacles according to the invention, showing polymeric translucent overlays spaced outwardly from the lens region thereof in exploded fashion.
Figure 4:
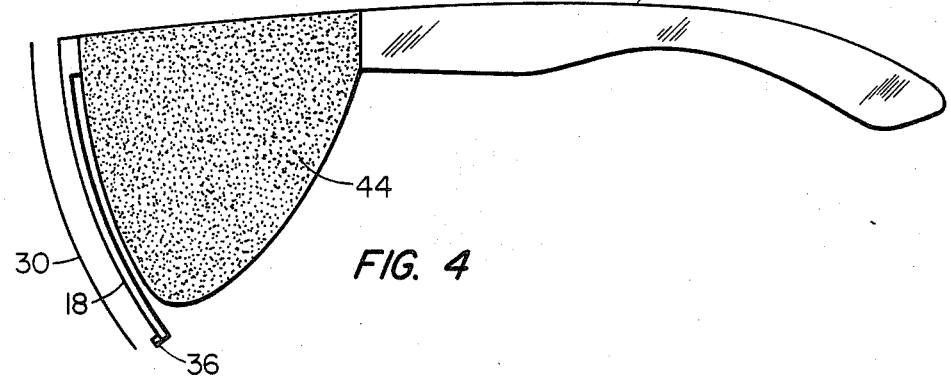
FIG. 4 is a side view of the spectacles of FIG. 3.

With the approach of the instant invention the large, somewhat unweildy if not dangerous vision occluding devices of the past are replaced with a relatively inexpensive, very light, easily storable, and comfortable vision occlusion apparatus which is fabricated much in the manner of conventional industrial safety goggles or spectacles. Referring to FIGS. 2–4, such spectacles shown generally at 16, are revealed, these spectacles being structured, for example, of conventional polymeric material such as polystyrene or polycarbonate. Of the figures, FIG. 2 shows the structure of the goggles as viewed from the position of a student pilot wearing them. The spectacles, or goggles 16, include a non-correcting lens or principal lens region as at 18 which has formed integrally therewith a forward support region 20 structured generally as a saddle which is nestable over the upper nose region of the pilot utilizing the device. The nose support 20 serves to position the lens region 18 before the eyes of the pilot and cooperates with two earpiece components 22 and 24 (FIGS. 3 and 4) which are respectively pivotally coupled to the lens region 18 at 26 and 28. Earpieces 22 and 24 serve the conventional function of typical spectacles.

Lens region 18 is structured such that it is of area extent effective to intercept substantially all forward vision of the pilot.

Spectacles 16 further are structured to support an occlusion arrangement 30 at the outwardly disposed surface of lens region 18. Occlusion arrangement 30 may be present as a thin polymeric material overlay as is represented in exploded fashion in FIG. 3. Overlay 30 is translucent to an extent wherein distance visibility therethrough is selectively restricted and the area extent of the overlay is such as to occlude the vision of the pilot with respect to lines-of-sight in visual space extending from the pilot eyes through the windscreen of the aircraft within which he is sitting but to permit unrestricted in-cockpit vision. Accordingly, as represented by the border defining peripheries of the occlusive material 30, as at 32 and 34, the non-correcting lens region 18 is unobstructed in the vicinity of nose support 20. This permits an unrestricted line-of-sight in visual space from the pilot's eyes to a region within the cockpit which extends below the corresponding periphery of the aircraft cowling. Thus, the pilot is permitted to observe the instrumentation within the cockpit while vision through the windscreen of the aircraft is restricted in a manner simulating adverse weather. The occlusive arrangement 30 may be present as a very thin polymeric material, for example, having such thinness as to permit its selective adherence to the outward surface of lens region 18 by a simple expedient of static electricity. To permit the proper and facile removable mounting of overlay 30, outwardly extending small tabs as at 36 and 38 may be integrally molded as a portion of the lens region 18 of the spectacle 16.

Observing the left eye portion of lens region 18 in FIG. 2, it may be observed that the overlay 30 border 32 is structured to define an unoccluded area 40 of lesser extent than the corresponding unoccluded area 42 defined by border 34. This geometry is provided inasmuch as the command position at which most pilots train is the left seat of the aircraft and the left eye of the pilot is closer to the left side window. Correspondingly, inasmuch as the right side window is further from the pilot, unoccluded area 42 is of correspondingly enlarged extent to permit the pilot to observe the full extent of the cockpit instrumentation toward his right. In effect, the border 32 of the overlay 30 is structured, with respect to the left eye lens region 18 as being substantially defined by lines of sight between the pilots left eye and the forwardmost region of the left side window. Conversely, the border 34 of the occlusion arrangement 30 is structured with respect to the right eye lens region 18 as being defined substantially by lines-of-sight between the pilot's right eye and the forwardmost region of the right side cockpit window.

Looking to FIG. 4, spectacles 16 additionally are shown to be formed including a mask region for each of the earpieces 22 and 24, that mask region 44 which is formed with respect to earpiece 22 being revealed. Region 44 extends rearwardly from adjacency with the frame of the spectacles and serves to occlude lines of sight representing peripheral vision of the pilot. While the degree of occlusion for areas as at 44 may vary, it generally is practical to provide for fully restricting the vision of the pilot while still permitting light to pass through the translucent region. With such arrangement, the resultant light transmission tends to negate any claustrophobic effects which otherwise would be encountered with materials fully opaque to light.

Referring to FIG. 3, in simalar fashion, the frame of spectacles 16 is configured such that the uppermost border thereof is configured as at 46 to extend rearwardly or toward the forehead of the pilot to a position providing substantially for nesting contact with such forehead. As before, it is preferred that the region 46 be translucent to an extent permitting the entry of diffused light.

To provide for training utilizing the spectacles as at 16, the pilot undergoing training puts on the spectacles 16 and the instructor will have selected an overlay 30, the translucency of which is selected with respect to a predetermined visibility distance, for example, 5 miles. Later in the flight, a second polymeric overlay, for example, as shown in expanded fashion at 48 in FIG. 3, may be placed over the initial polymeric overlay 30. This second polymeric overlay will be positioned in proper orientation by nesting relationship with tabs 36 and 38 and will adhere to the outwardly disposed surface of overlay 30 by the earlier-described static electricity. Thus, the combined overlays 30 and 48 provide still a higher degree of translucency to represent a further diminished visibility distance, for example, 3 miles. Other polymeric overlays may be utilized until such sight distance is diminished to zero. During the course of the utilization of numbers of overlays as at 30 and 48, the instructor may observe the pilot's flying reactions, and, in particular, may note whether or not the pilot is inadvertently descending the aircraft to maintain a natural horizon. Where such inadvertent descent is being made, the fact thereof may be brought to the pilot's attention and an enhanced awareness of such involuntary reactions may be developed. Further, the necessity to fly low to see forward terrain makes the navigation problems much different than on a clear day and thus the goggles supply a more realistic training technique for cross country navigation—better suited to the "real world".

Because the polymeric overlays as at 30 and 48 are translucent in optical effect, light, albeit diffused, will be permitted to pass through the lens regions 18. In consequence, a more realistic as well as convenient technique for simulating occluded vision is achieved. Further, the claustrophobic effects otherwise encountered in conjunction with prior art training implements generally are avoided, the device 30 remains light, easily storable and comfortable to wear and its cost is well within reason.

Since certain changes may be made in the above-described apparatus without departing from the scope of the invention herein involved, it is intended that all matter contained in the description thereof or shown in the accompanying drawings shall be interpreted as illustrative and not in a limited sense.

I claim:

1. Visual occlusion apparatus for selectively occluding the vision of a pilot during training procedures wherein the pilot is seated at a command position next to oppositely disposed side viewing windows and before a windscreen extending upwardly from a periphery defining cowling region, comprising:

spectacle means including a principal lens region having a right eye lens region and a left eye lens region, each of predetermined area extent, means defining a frame having a forward support region nestable over the upper nose region of said pilot for positioning said lens region before the eyes of said pilot and two earpiece components mutually spaced, pivotally coupled at the opposite, outwardly disposed peripheries of said lens region and each being extensible over an ear of said pilot, each said earpiece component including a translucent mask extending rearwardly from adjacency with said frame for occluding lines of sight representing peripheral vision of said pilot, said right and left eye lens regions predetermined area extent being effective for intercepting all substantially forward vision of said pilot when positioned before the eyes thereof; and occlusion means at said lens region and having border defined area extent for selectively occluding the vision of said pilot for lines of sight in visual space extending from the eyes of said pilot through said windscreen and effecting unrestricted lines of sight in visual space extending below said periphery defining cowling region, the laterally disposed said border with respect to said right eye lens region being substantially defined by lines of sight between said pilot's right eye and the forwardmost region of the right said side window, the laterally disposed said border with respect to said left eye lens region being substantially defined by lines of sight between said pilot's left eye and the forwardmost region of the left said side window, and said select occlusion being effected as a translucency diffusing light through said right and left eye lens regions to an extent selected to diffusely restrict the sight of said pilot with respect to a predetermined visibility distance.

2. The visual occlusion apparatus of claim 1 in which said occlusion means comprises a first thin polymeric overlay manually positionable over said spectacle means right and left eye lens regions and substantially uniformly translucent.

3. The visual occlusion apparatus of claim 2 in which said occlusion means comprises a second thin polymeric overlay co-extensive with and manually positionable over said first thin polymeric overlay and substantially uniformly translucent in an amount selected with respect to a predetermined visibility distance.

4. The visual occlusion apparatus of claim 2 in which said first thin polymeric overlay is configured for removable retention upon said spectacle means by static electricity.

5. The visual occlusion apparatus of claim 1 in which said occlusion means is integrally fixed upon said spectacle means right and left eye lens regions.

6. The visual occlusion apparatus of claim 1 in which said spectacle means frame is configured to extend to a substantially nesting contact with the forehead of said pilot when worn so as to preclude upward vision.

7. Training apparatus for selectively occluding the vision of an aircraft pilot during training procedures wherein the pilot is seated at a commond position next to oppositely disposed side viewing windows and before a windscreen extending upwardly from a periphery defining cowling region, cockpit instrumentation being present before said pilot in a region beneath said cowling region, said apparatus comprising:

spectacle means including a non-correcting lens region having an area extent disposed between upper and lower borders substantially corresponding with the field of view of the eyes of said pilot, means defining a frame structure having a forward support portion including a bridge nestable over the upper nose region of said pilot for supporting said lens region at a position intercepting said pilot field of view, said frame including two earpiece components mutually spaced, pivotally coupled at opposite, outwardly disposed peripheries of said lens regin and each being extensible over an ear of said pilot, said lens region having right and left clear portions positionable respectively before the right and left eye of said pilot, each said clear region extending upwardly from said lower border to an upward periphery positioned at the limit of lines of sight from said pilot's eyes extending only to regions within said cockpit below said periphery defining cowling region, each said clear region extending laterally outwardly from said bridge to respective right and left linear peripheries positioned to permit uninterrupted lines of sight from said respective right and left eyes to said cockpit instrumentation, each said earpiece component including a mask extending rearwardly from adjacency with said lens region;

said right and left clear portions being surmounted by translucent portions of said lens region and each said mask being translucent, said translucency of said lens region extending to said upper border and outwardly from said right and left peripheries and being of an extent precluding clear vision by said pilot therethrough while permitting selectively diffuse illumination to pass therethrough so as to selectively limit pilot vision through said windscreen and side viewing windows while minimizing claustrophobic pilot reaction.

8. The training apparatus of claim 7 in which said spectacle means are provided as goggles formed of a clear polymeric material and said translucent portions are integrally formed upon said polymeric material.

9. The training apparatus of claim 8 in which said extent of translucency is selected to fully preclude pilot vision through said translucent portions.

10. The training apparatus of claim 9 wherein:
said left clear portion left periphery is positioned to substantially coincide with lines of sight extending between said left eye and the forwardmost region of the left said side window; and
said right clear portion right periphery is positioned to substantially coincide with lines of sight extending between said right eye and the forwardmost region of the right said side window.

* * * * *